United States Patent

Pircher

[11] 4,286,878
[45] Sep. 1, 1981

[54] OPTICAL FIBRE INTERFEROMETRIC GYROMETER WITH POLARIZATION SWITCHING

[75] Inventor: Georges Pircher, Paris, France
[73] Assignee: Thomson-CSF, Paris, France
[21] Appl. No.: 56,107
[22] Filed: Jul. 9, 1979
[30] Foreign Application Priority Data
  Jul. 10, 1978 [FR] France ................. 78 20540
[51] Int. Cl.³ ............................. G01C 19/64
[52] U.S. Cl. ........................ 356/350; 356/351
[58] Field of Search ..................... 356/350, 351
[56] References Cited
  U.S. PATENT DOCUMENTS
  3,867,034  2/1975  Aronowitz ............... 356/351
  4,013,365  3/1977  Vali et al. ............... 356/350

Primary Examiner—Vincent P. McGraw
Attorney, Agent, or Firm—Cushman, Darby & Cushman

[57] ABSTRACT

An interferometric gyrometer using a laser source and beam separator forming two waves each directed to one end of a wound monomode fiber and recombined after passage. A permanent phase shift equal to $\pi/2$ is introduced between the two waves emerging from the ends of the fiber, and a switch is alternately shifted between a state transmitting the recombined waves and a state inverting the phase of the recombined waves. A synchronous demodulator, receiving the detected and amplified signal and a signal synchronous with the control signal applied to the switch supplies a signal proportional to the speed of rotation of the gyrometer.

5 Claims, 4 Drawing Figures

OPTICAL FIBRE INTERFEROMETRIC GYROMETER WITH POLARIZATION SWITCHING

BACKGROUND OF THE INVENTION

1. Field of the Invention

This invention relates to the measurement of angular speed and, more particularly, to a fibre-based interferometric gyrometer using the Sagnac effect, the angular speed being determined by interferometric measurement.

2. Description of the Prior Art

Interferometric gyrometers are known which use a wound optical fibre simultaneously traversed by two light waves travelling through the fibre in opposite directions. When the assembly is rotated about the axis of the wound fibre, one of the waves travels in the direction of rotation and the other in the opposite direction. The two waves emerging from the ends of the fibre are phase-shifted and this phase-shift is proportional to the speed of rotation. This phase-shift is displayed by recombining the emerging waves by interference. The level of the detected signal is related to the phase shift between the two waves and complies with a law in $Cos^2$. In order approximately to obtain the proportionality between the level of the detected signal and the phase-shift at low speeds and to change the direction of the phase-shift at the same time as the direction of the speed, a phase-shift equal to $\pi/2$ is introduced between the two waves so that, at zero speed, the level of the detected signal is a mean level which increases or decreases according to the direction of rotation.

With an arrangement such as this, it is not possible to overcome the drifts inherent in the apparatus, namely: the drift of the amplifier, the drift of the output power of the laser etc. In order to reduce the lowest measurable speed and to approach the lower limiting speed capable of being detected, it is possible to introduce a modulation followed by a synchronous demodulation which enables some of the noise of the system to be eliminated.

SUMMARY OF THE INVENTION

The present invention relates to a highly sensitive fibre-based interferometric gyrometer comprising switching means by which it is possible alternately to obtain the phase-shift corresponding to the speed of rotation in one direction and then the phase shift corresponding to a reversal of the direction of rotation in relation to the light waves travelling through the system. The switching means may be formed by a polarisation switch which reverses the polarisations of two light waves having a given phase relation between them, means being provided on the fibre for successively directing the waves having a given polarisation in each of the two directions of travel through the fibre. The signal issuing from the detector is then demodulated by means of a synchronous demodulator controlled by a signal synchronous with the signal applied to the switching means. An arrangement such as this enables the speed capable of being detected to be considerably reduced.

BRIEF DESCRIPTION OF THE DRAWINGS

The invention will be better understood and other features thereof will become apparent from the following description in conjunction with the accompanying drawings, wherein.

DESCRIPTION OF THE PREFERRED EMBODIMENTS

Figure 2:
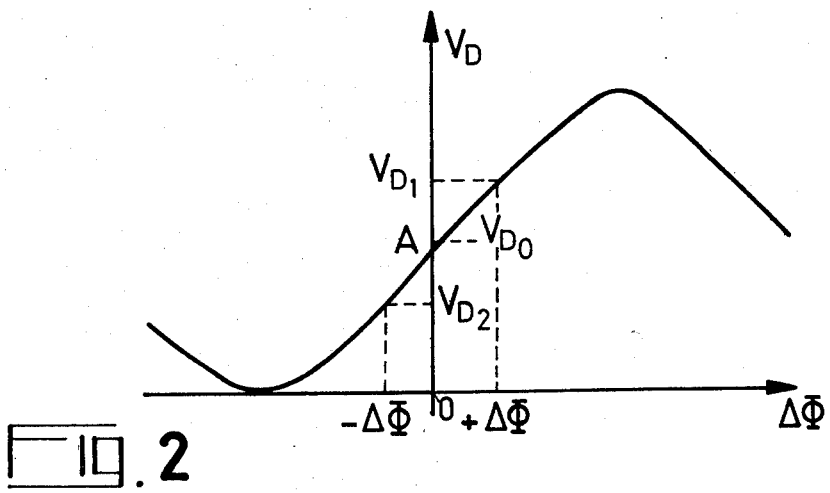
FIG. 2 shows a curve representing the variations in the output signal of the detector in dependance upon the phase shift between the two waves and, hence, upon the speed of rotation.

An optical fibre interferometric gyrometer generally comprises a laser source, radiation separating and mixing means enabling the monochromatic radiation issuing from the source to be simultaneously directed in halves towards the two ends of a spirally wound optical fibre of considerable length and the waves emerging from the two ends of the optical fibre to be subsequently mixed after having passed through the fibre. When the fibre rotates at the speed $\Omega$ to be measured, the waves emerging from the ends of the fibre show a phase shift $\Delta\Phi$ due to the rotation $\Delta\Phi = 8\pi/C\lambda sN\Omega$, where C is the speed of the light, $\lambda$ the wavelength of the radiation, s the surface area of one turn of the fibre and N the number of turns. A quadratic detector collects a signal $V_D = A \, Cos^2 \, \Delta\Phi$ where A is the amplitude of this signal. At low speeds, $\Delta\Phi$ tends towards 0 and the intensity approaches the maximum. In order to obtain better detection at low speeds, as indicated above, the two waves are phase-shifted by a fixed phase shift so that, for $\Omega = 0$, the detected level corresponds to the inflection point of the curve in such a way that the variations are as large as possible. This result is obtained by phase-shifting the two waves by $\pi/2$. The intensity obtained in this case is shown in FIG. 2 as a function of the phase-shift $\Delta\Phi$ variable according to the speed. The point A, where the detected signal is $V_{D0}$, corresponds to $\Omega = 0 (\Delta\Phi = 0)$.

In order to eliminate at least some of the noise introduced by the system, the gyrometer according to the invention comprises switching means for alternately transmitting without modification and inverting the phase of the recombined beam. Accordingly, the phase-shift between these two waves passes from $+\Delta\Phi$ to $-\Delta\Phi$ in step with switching frequency and, since the phase shift of $\pi/2$ is created between these two waves still in the same direction, the levels measured at the detector successively correspond to $V_{D1}$ and $V_{D2}$. A synchronous demodulator receiving the output signal of the detector and a signal synchronous with the control signal applied to the switching means thus supplies a signal directly related to the speed of rotation.

Figure 1:
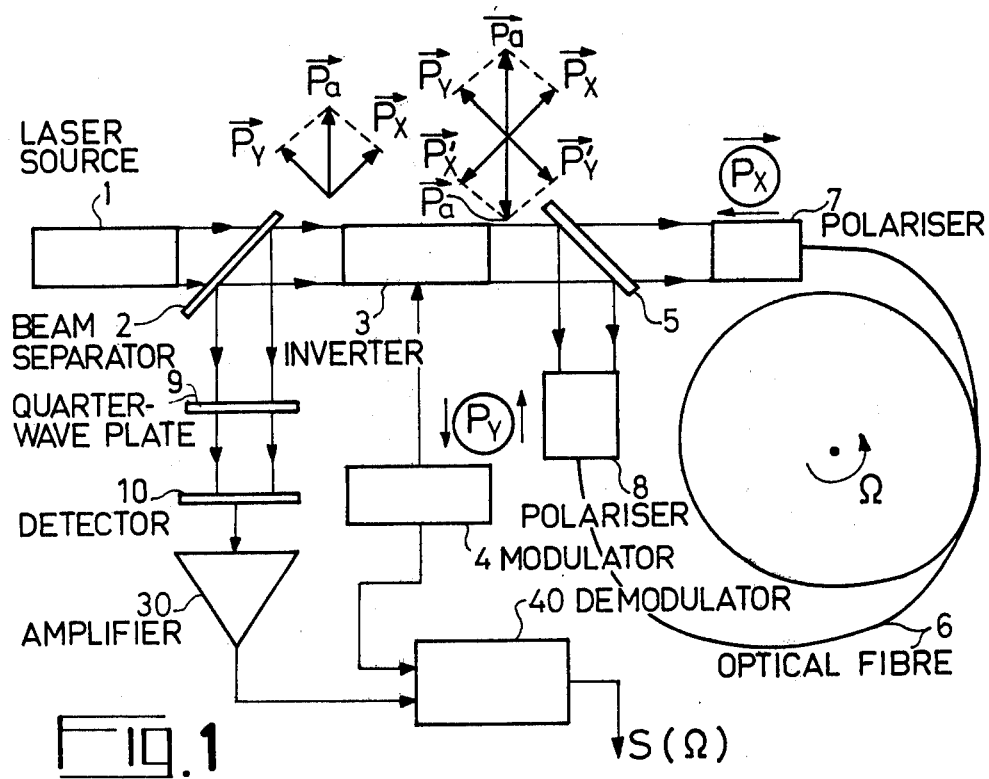
FIG. 1 diagrammatically illustrates the fibre-based interferometric gyrometer according to the invention.
Figure 3:
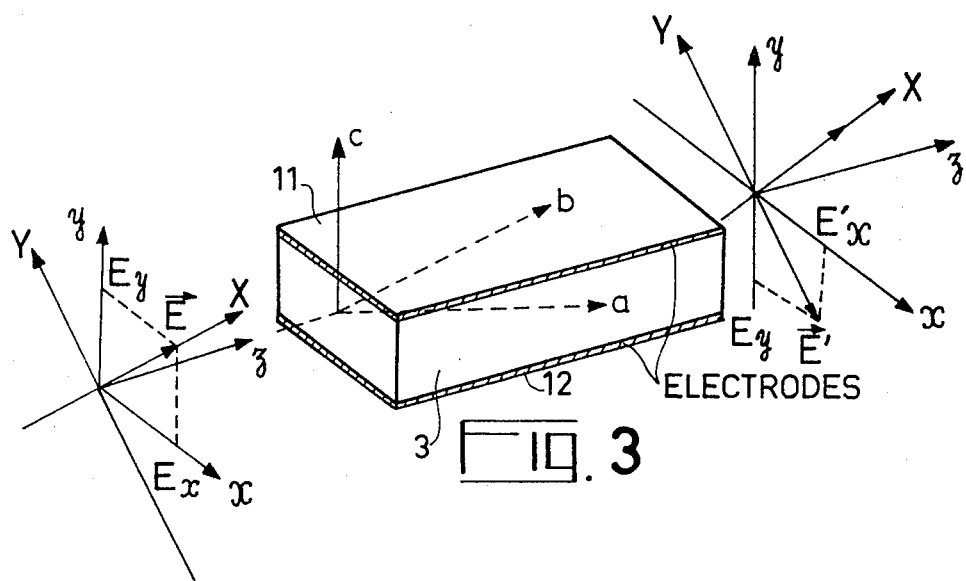
FIG. 3 diagrammatically illustrates the Pockels effect polarisation inverter used by way of example in the gyrometer shown in FIG. 1.

One embodiment of the optical fibre interferometric gyrometer according to the invention is shown in FIG. 1. It comprises a laser source 1 emitting a monochromatic beam with linear polarisation $\vec{Pa}$. The system has an axis Oy extending in the direction of $\vec{Pa}$ and an axis Oz which is the axis of propagation of the beam, Ox being the axis orthogonal to Oy in the polarisation plane. A beam separator 2 is placed in the path followed by the beam so as to separate the return beam from the beam issuing from the laser. A Pockels effect electro-optical inverter is placed in the path followed by the beam. This inverter uses a deuterium-containing KDP crystal, i.e. KD*P (in which one molecule of hydrogen of the dihydrogenated potassium is replaced by one molecule of deuterium). The inverter is diagrammatically illustrated in FIG. 3 where the axes x, y and z of the optical system of FIG. 1 are shown. The crystal is cut in such a way that its optical axis Oc follows the thickness of the crystal, the mechanical axes Oa and Ob, which are not differentiated because the crystal is monoaxial, being in the plane of the large faces. In the optical system shown in FIG. 1, this crystal is used in such a way that its optical axis Oc extends in the direction Oy. Electrodes 11 and 12 are provided on the large faces of the crystal so that the field is applied in the direction Oy. This transverse configuration of the field in relation to the optical axis of the beam is advantageous because the electrodes are not situated in the path followed by the beam.

An incident vibration linearly polarised on entering the crystal will only emerge with linear polarisation if its components following Ox and Oy, which travel at different speeds, are in phase on emerging from the crystal. If the length of the crystal is suitably selected and if this condition is fulfilled both in the presence and in the absence of the field, the polarisation inverter will operate in such a way that, in the absence of the field, the polarisations will be maintained and, in the presence of the field, a polarisation $\vec{E}$ having components $E_x$ and $E_y$ following the axes x and y will be converted into $\vec{E}'$ with components $E'_x = E_x$ and $E'_y = -E_y$. Accordingly, in the presence of the field, an incident polarisation $\vec{Pa}$ directed along the optical axis decomposable into two components $P_X$ and $P_Y$ on axes XY at 45° to the axes x and y will be converted into $-\vec{Pa}$ decomposable into two components $P'_Y$ converted from $P_X$ and $P'_X$ converted from $P_Y$.

This electrooptical inverter 3 is controlled by a modulator 4 which supplies pulses having a frequency of several hundred kilocycles per second and several hundred volts. This inverter 3 is followed along the optical path by a beam separator 5 dividing the incident beam into two halves, one of which is directed towards a polariser 7, of which the polarisation direction is for example the direction X, whilst the other is directed towards a second polariser of which the polarisation direction is the direction orthogonal to the direction of the polariser 7, i.e. for example the direction Y. Accordingly, the beams emerging from these two polarisers will be those fractions of the beam impinging on these polarisers which are respectively polarised in the directions X and Y. The symbols $(P_X)$ and $(P_Y)$ used in FIG. 1 represent the polarisations following the directions X and Y (without any distinction as to their direction). The arrows indicate the direction of propagation. These two waves respectively traverse the wound monomode optical fibre 6 in one direction and the other. During this passage, the polarisation undergoes various effects attributable in particular to the reflections at the core-cladding dioptre and, after passing through the fibre, the polarisations of these two waves are no longer determinable. However, the passage of these two waves through the polarisers 8 and 7, respectively, for the waves initially polarised in the directions X and Y selects those fractions of the beam which correspond to the directions of polarisation of the polarisers, namely Y and X respectively.

These two waves emerging from the polarisers after passage through the fibre are phase-shifted by $\Delta\Phi = 2d\phi$, one having undergone a phase shift $d\phi$ and the other a phase shift $-d\phi$. A fraction of one is reflected by the beam separator 5 whilst a fraction of the other is transmitted by this separator so that a resultant wave is obtained at the entrance to the electrooptical inverter 3. If the inverter is in the non-excited state, the linearly polarised components following the directions X and Y are maintained in the same way as for the outward passage whereas, if the inverter is in the excited state, these polarisation components are inverted. The return beam emerging from the inverter is reflected by the beam separator 2 towards a quarter-wave plate 9 which introduces a phase shift of $\pi/2$ between the waves corresponding to the two preceding polarisation directions X and Y. The beam emerging from the quarter wave plate 9 is detected by a quadratic detector 10 which transmits the detected signal $V_D$ to an amplifier 30. The signal issuing from the amplifier 30 is demodulated by a demodulator 40 which, at its second input, receives a signal synchronous with the outputs signal of the modulator 4 applied to the electrooptical inverter 3.

Figure 4:
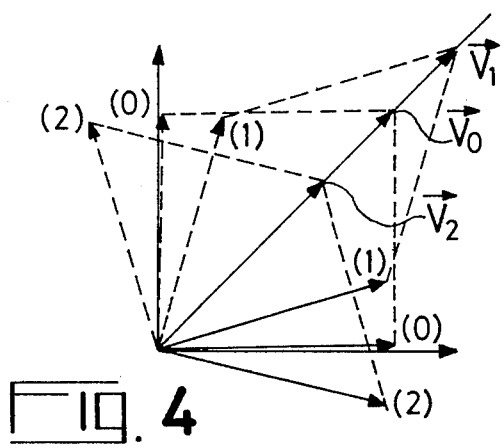
FIG. 4 is a Fresnel vector diagram illustrating the operation of the gyrometer according to the invention.

When the assembly rotates at the speed $\Omega$ about the axis of the helix formed by the wound monomode fibre, the wave travelling in the direction of rotation emerges from the fibre with a lag in relation to the same wave when the gyrometer is stationary, which corresponds to a phase-shift of $+d\phi$. The phase-shift between the two waves is thus equal to $\Delta\Phi = 2d\phi$ and changes sign with each inversion of polarisation, each wave being reflected towards the quarter wave plate with a polarisation of fixed direction, irrespective of the state of the polarisation inverter 3. The quarter wave plate, of which the neutral lines are directed at 45° to the polarisation axes X and Y, i.e. following the axes x and y, introduces a phase shift equal to $\pi/2$ between the two waves. Assuming that the slow and fast axes of the plate are such that the second wave lags behind the first, the operation of the system may be illustrated by the Fresnel vector diagram shown in FIG. 4. The waves are represented by the solid-line and dotted-line vectors. In the absence of rotation, the vectors representing the index (0) show a fixed shift of $\pi/2$. The quadratic detector 10 thus collects a signal of constant level $V_{D0}$ corresponding to the resultant $\vec{V}_0$. In the state (1), which corresponds to the non-excited state of the inverter, and when the gyrometer rotates, the two waves are phase-shifted by $+\Delta\Phi$, the first being phase-shifted by $+d\phi$ in relation to its state (0) and the other by $-d\phi$ in relation to its state (0), which thus corresponds to a level $V_{D1}$ corresponding to the resultant $\vec{V}_1$. Conversely, when the inverter is in its excited state, the first wave lagging by $-d\phi$ and the second leading by $+d\phi$, the phase-shift between the two, $-\Delta\Phi$, leads to a resultant $\vec{V}_2$ corresponding to a level $V_{D2}$.

When the speed is constant, due solely to the switching obtained by the inversion of polarisation, the level of the signal collected by the detector varies between $V_{D1}$ and $V_{D2}$, the difference between these two levels being proportional to the speed. The demodulator 40 which demodulates this signal by a signal synchronous with the modulation signal of the inverter thus supplies a signal $S(\Omega)$ proportional to the speed of rotation $\Omega$.

The invention is not limited to the embodiment precisely described and illustrated. In particular, it is possible to associate other switching means with phase-shift means providing the two waves alternately emitted towards one end and the other of the wound fibre and phase-shifted in relation to one another by $\pi/2$ are alternately advanced and retarded, in step with the switching frequency, during their passage through the fibre under the effect of the rotation. For example, it would be possible to use a magnetooptical polarisation inverter instead of the electrooptical polarisation inverter. It would also be possible, but more difficult, to use mechanical switching.

What we claim is:

1. An optical fiber interferometric gyrometer comprising:
   a laser source emitting a linearly polarised monochromatic beam;
   an optical fiber wound around the axis of rotation of the gyrometer;
   means for separating said beam into two waves, directing said waves for travel through said fiber in opposite directions and recombining the waves after travel through said fiber;
   switching means having a first state transmitting the recombined waves without modification and a second state inverting the phase of said recombined waves;
   fixed phase shift means for introducing a fixed phase shift equal to $\pi/2$ between the two waves;
   modulating means for producing a signal for alternately shifting said switching means between said first and second states;
   means for detecting the recombined waves after passage through said switching means and said fixed phase shift means; and
   a synchronous demodulator connected to said detector means, and to said modulating means for producing a signal indicating the rotation speed of the gyrometer.

2. A gyrometer as claimed in claim 1, wherein the switching means comprises a polarisation inverter and said separating, directing and recombining means includes a beam splitter and two polarisers, the polarisation inverter transmitting without modification or inverting, according to two states of the alternating signal applied thereto, the polarisation components of the incident beam oriented in the direction of the axes X and Y at 45° to the axis of polarisation of the incident beams, the two polarisers respectively transmitting the polarisation components following X and Y to the two ends of the wound optical fiber, the gyrometer further comprising separation means situated between the laser source and the inverter for separating the return beam from the outward beam and wherein said fixed phase shift means includes a quarter wave plate phase-shifting the polarisation components following X and Y by $\pi/2$ in relation to one another, the detector means detecting the beam issuing from the quarter wave plate.

3. A gyrometer as claimed in claim 2, wherein the polarisation inverter is an electrooptocal inverter controlled by an electrical field.

4. A gyrometer as claimed in claim 3, wherein the electrooptical inverter is a crystal of the KD*P-type in which the inversion of polarisation is obtained by Pockels effect.

5. A gyrometer as claimed in claim 2, wherein the polarisation inverter is a magnetooptical inverter controlled by a magnetic field.

* * * * *